US012109949B2

(12) United States Patent
Zhu et al.

(10) Patent No.: US 12,109,949 B2
(45) Date of Patent: Oct. 8, 2024

(54) IN-VEHICLE ELECTRONIC DEVICE AND METHOD FOR CONTROLLING THE SAME, AND VEHICLE

(71) Applicant: Faurecia Clarion Electronics (Xiamen) Co., Ltd., Fujian (CN)

(72) Inventors: Fubin Zhu, Fujian (CN); Hengqiang Zhang, Fujian (CN); Jianyuan Liang, Fujian (CN)

(73) Assignee: FAURECIA CLARION ELECTRONICS (XIAMEN) CO., LTD., Fujian (CN)

( * ) Notice: Subject to any disclaimer, the term of this patent is extended or adjusted under 35 U.S.C. 154(b) by 394 days.

(21) Appl. No.: 17/584,646

(22) Filed: Jan. 26, 2022

(65) Prior Publication Data
US 2022/0242333 A1 Aug. 4, 2022

(30) Foreign Application Priority Data
Jan. 29, 2021 (CN) .......................... 202110129997.0

(51) Int. Cl.
*B60R 11/04* (2006.01)
*B60R 11/00* (2006.01)
*G06V 20/59* (2022.01)
*G06V 40/16* (2022.01)
*H04N 23/90* (2023.01)

(52) U.S. Cl.
CPC .............. *B60R 11/04* (2013.01); *G06V 20/59* (2022.01); *G06V 40/172* (2022.01); *H04N 23/90* (2023.01); *B60R 2011/0003* (2013.01); *B60R 2011/0082* (2013.01); *B60R 2011/0085* (2013.01); *B60R 2011/0092* (2013.01)

(58) Field of Classification Search
None
See application file for complete search history.

(56) References Cited

U.S. PATENT DOCUMENTS

2006/0006685 A1* 1/2006 Shibukawa ............. B60R 13/02
296/39.1
2014/0211010 A1 7/2014 Alexander et al.
(Continued)

FOREIGN PATENT DOCUMENTS

CN 1200336 A * 12/1998
CN 205630647 U 10/2016
(Continued)

OTHER PUBLICATIONS

Extended European Search Report issued in corresponding European Patent Application No. 22153352.4 dated Jul. 4, 2022.

*Primary Examiner* — Quan Pham
(74) *Attorney, Agent, or Firm* — Morgan, Lewis & Bockius LLP

(57) ABSTRACT

An in-vehicle electronic device includes a host, a first camera, and a first driving device. The first camera is moveably connected to the host, and is configured to capture at least one image of an interior of a vehicle. The first driving device is connected to the first camera, and is configured to drive the first camera to slide between an extended position and a retracted position, so that when the first camera is at the extended position, the first camera is located outside the host, and when the first camera is at the retracted position, the first camera is located inside the host.

20 Claims, 9 Drawing Sheets

(56) References Cited

U.S. PATENT DOCUMENTS

2017/0136963 A1 5/2017 Carson
2021/0370879 A1* 12/2021 Julian .................. B60R 25/257

FOREIGN PATENT DOCUMENTS

| CN | 209986948 U | 1/2020 |
| CN | 210025306 U | 2/2020 |
| CN | 111216649 A | 6/2020 |
| CN | 211001902 U | 7/2020 |

* cited by examiner

IN-VEHICLE ELECTRONIC DEVICE AND METHOD FOR CONTROLLING THE SAME, AND VEHICLE

CROSS-REFERENCE TO RELATED APPLICATION

This application claims priority to Chinese Patent Application No. 202110129997.0, filed on Jan. 29, 2021, which is incorporated herein by reference in its entirety.

TECHNICAL FIELD

The present disclosure relates to the field of in-vehicle device technologies, and in particular, to an in-vehicle electronic device and a method for controlling the same, and a vehicle.

BACKGROUND

At present, manufacturers of in-vehicle electronic devices have produced an in-vehicle electronic device (or referred to as an intelligent in-vehicle robot) that integrates functions of a drive recorder, a face recognition device, a driver monitoring system (DMS) and the like.

SUMMARY

In an aspect, an in-vehicle electronic device is provided. The in-vehicle electronic device includes: a host having a receiving cavity; a first camera moveably connected to the host and configured to capture at least one image of an interior of a vehicle; and a first driving device connected to the host and the first camera and configured to drive the first camera to move between an extended position and a retracted position, so that when the first camera is at the extended position, the first camera is located outside the host, and when the first camera is at the retracted position, the first camera is located in the receiving cavity.

In some embodiments, the in-vehicle electronic device further includes at least one sliding structure connected to at least one side wall of the receiving cavity and at least one respective side wall of the first camera. The at least one sliding structure is configured to assist the first camera to move between the extended position and the retracted position under driving of the first driving device.

In some embodiments, the at least one sliding structure includes one sliding structure. The one sliding structure includes at least one slider and a sliding groove. A groove is provided in one of the at least one side wall of the receiving cavity, and the sliding groove is fixed in the groove. The at least one slider is fixed to a side wall of the first camera opposite to the one of the at least one side wall of the receiving cavity, is at least partially located in the sliding groove and is slidable in the sliding groove.

In some embodiments, the at least one sliding structure includes one sliding structure. The one sliding structure includes at least two slide rails and a plurality of balls between side walls of the at least two slide rails. A groove is provided in one of the at least one side wall of the receiving cavity, one slide rail is fixed in the groove, and another slide rail is fixed on a side wall of the first camera opposite to the one of the at least one side wall of the receiving cavity. The balls are rollable between the side walls of the at least two sliding rails.

In some embodiments, the first driving device includes a first motor, a gear, and a rack disposed in the receiving cavity. An output shaft of the first motor is fixed to the gear, the gear is engaged with the rack, and the rack is fixed to a side wall of the first camera.

In some embodiments, the at least one sliding structure includes four sliding structures, two of the four sliding structures are connected to a side wall of the first camera, and another two are connected to an opposite side wall of the first camera. The rack is fixed on any side wall of the side walls of the first camera that are provided with the sliding structures and is located between the two sliding structures on the side wall of the side walls.

In some embodiments, each sliding structure includes at least one slider and a sliding groove. A groove is provided in a side wall of the receiving cavity to which the sliding structure is connected, and the sliding groove is fixed in the groove. The at least one slider is connected to a side wall of the first camera opposite to the side wall of the receiving cavity, is at least partially located in the sliding groove and is slidable in the sliding groove.

In some embodiments, the in-vehicle electronic device includes a base and a second driving device. The second driving device is connected to the base and the host, and is configured to drive the host to rotate horizontally relative to the base.

In some embodiments, the second driving device includes a second motor, a reduction gear set and a transmission shaft. The transmission shaft is connected to the host. The reduction gear sect is connected to the second motor and the transmission shaft, and the reduction gear set is configured to make a rotation speed of the host slower than a rotation speed of the second motor.

In some embodiments, the reduction gear set includes: a first gear, a second gear, a third gear, a fourth gear, a fifth gear, and a sixth gear. An output shaft of the second motor is fixed to a center of an end surface of the first gear. The second gear is engaged with the first gear, and a diameter of the second gear is greater than that of the first gear. An end surface of the second gear proximate to the second motor is in direct contact with an end surface of the third gear, and the second gear and the third gear are configured to coaxially rotate. The fourth gear is engaged with the third gear, and a diameter of the fourth gear is greater than that of the third gear. An end surface of the fourth gear proximate to the second gear is in direct contact with an end surface of the fifth gear, and the fourth gear and the fifth gear are configured to coaxially rotate. The sixth gear is engaged with the fifth gear, and a diameter of the sixth gear is greater than that of the fifth gear. A center of an end surface of the sixth gear away from the fourth gear is connected to an end of the transmission shaft, and an opposite end of the transmission shaft penetrates the base and is connected to the host.

In some embodiments, the base has an accommodating cavity therein, and the second driving device is disposed in the accommodating cavity.

In some embodiments, the in-vehicle electronic device further includes a lifting mechanism connected to the base. The lifting mechanism is configured to drive the base to lift between a raised position and a storage position, so that when the base is at the raised position, both the base and the host are located outside an interior trim panel of the vehicle, and when the base is at the storage position, both the base and the host are located inside the interior trim panel of the vehicle.

In some embodiments, the lifting mechanism includes a third motor, a screw rod and at least one guide rod. An end surface of the base proximate to the third motor is provided with a threaded hole and at least one guide hole that are parallel to each other. An end of the screw rod is fixedly connected to an output shaft of the third motor, and an opposite end of the screw rod cooperates with the threaded hole. The at least one guide rod each includes an end extending into a respective one of the at least one guide hole.

In some embodiments, the at least one guide hole includes a plurality of guide holes, and the plurality of guide holes are evenly distributed around a center of the base. The at least one guide rod includes a plurality of guide rods.

In some embodiments, the in-vehicle electronic device further includes a second camera. The second camera is connected to the host, and is configured to capture at least one image of an exterior of the vehicle.

In some embodiments, a groove is provided in an outer surface of the host, and the second camera is located in the groove.

In some embodiments, a top surface of the host is a curved surface with an opening, the first camera is configured to be extended or retracted through the opening, and the first camera is configured such that when the first camera is at the retracted position, a top surface of the first camera and the top surface of the host are matched to form an integral curved surface.

In some embodiments, the in-vehicle electronic device further includes a coating disposed on outer walls of the host and the first camera, and the coating is made of a material with a light absorption rate of less than 15%.

In another aspect, a vehicle is provided, including the above in-vehicle electronic device.

In yet another aspect, a method for controlling the in-vehicle electronic device is provided. The method includes: controlling the first camera to extend outside the host and be at the extended position; controlling the first camera to obtain a face image of a user; recognizing the face image to determine whether the user is a preset user, controlling the first camera to enter a monitoring mode when determining that the user is the preset user; and if receiving a privacy mode control instruction, controlling the first camera to switch from the monitoring mode to a privacy mode, so that the first camera is retracted into the host and at the retracted position.

In yet another aspect, a non-transitory computer-readable storage medium is provided, which stores computer program instructions that, when executed by a processor, cause the processor to perform the method in the above aspect.

BRIEF DESCRIPTION OF THE DRAWINGS

In order to describe technical solutions in the present disclosure more clearly, accompanying drawings to be used in some embodiments of the present disclosure will be introduced briefly below. However, the accompanying drawings to be described below are merely accompanying drawings of some embodiments of the present disclosure, and a person of ordinary skill in the art may obtain other drawings according to these drawings. In addition, the accompanying drawings to be described below may be regarded as schematic diagrams, but are not limitations on actual sizes of products, actual processes of methods and actual timings of signals to which the embodiments of the present disclosure relate.

DETAILED DESCRIPTION

Figure 1:
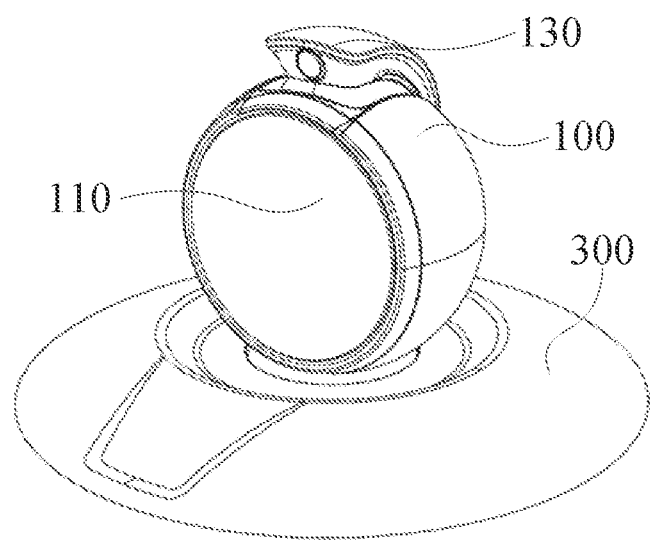
FIG. 1 is a schematic diagram of an in-vehicle electronic device (in which a first camera is at an extended position), in accordance with some embodiments.

An in-vehicle electronic device, a method for controlling the in-vehicle electronic device, and a vehicle provided by embodiments of the present disclosure will be described in detail below with reference to the accompanying drawings.

Unless the context requires otherwise, throughout the description and the claims, the term "comprise" and other forms thereof such as the third-person singular form "comprises" and the present participle form "comprising" are construed as an open and inclusive meaning, i.e., "including, but not limited to".

In the description of the specification, the terms such as "one embodiment", "some embodiments", "exemplary embodiments", "example" "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics may be included in any one or more embodiments or examples in any suitable manner.

It will be noted that, terms "arranged", "connected", "connection", etc. shall be understood in a broad sense, unless otherwise explicitly defined or limited. For example, it may be a fixed connection, a detachable connection, or an integral connection; it may be directly connected or indirectly connected through an intermediate medium, and it may be internal connection of two elements. Specific meanings of the above terms in the present disclosure shall be understood by a person skilled in the art on a case-by-case basis.

The phrase "A and/or B" includes the following three combinations: only A, only B, and a combination of A and B.

As used herein, the term "if" is optionally construed as "when" or "in a case where" or "in response to determining" or "in response to detecting", depending on the context. Similarly, the phrase "if it is determined" or "if [a stated condition or event] is detected" is optionally construed as "in a case where it is determined" or "in response to determining" or "in a case where [the stated condition or event] is detected" or "in response to detecting [the stated condition or event]", depending on the context.

The use of the phrase "applicable to" or "configured to" herein means an open and inclusive language, which does not exclude devices that are applicable to or configured to perform additional tasks or steps.

In the description of the present disclosure, it will be understood that orientations or positional relationships indicated by the terms "center", "upper", "lower", "front", "back", "left", "right", "vertical", "horizontal", "top", "bottom", "inner", "outer", etc. are based on the orientations or positional relationships shown in the drawings, and are only for the convenience of describing the present invention and simplifying the description, rather than indicating or implying the device or element referred to must have a specific orientation, be constructed and operated in a specific orientation, and therefore cannot be understood as a limitation of the present invention.

Below, the terms "first" and "second" are only used for descriptive purposes, and are not to be construed as indicating or implying relative importance or implicitly indicating the number of indicated technical features. Thus, a feature defined with "first" or "second" may explicitly or implicitly include one or more of the features. In the description of the present invention, "a plurality of" means two or more unless otherwise specified.

A vehicle generally includes a front view camera and a rear view camera. During operation of the vehicle, the front view camera and the rear view camera generally remain in an operating mode.

Figure 3:
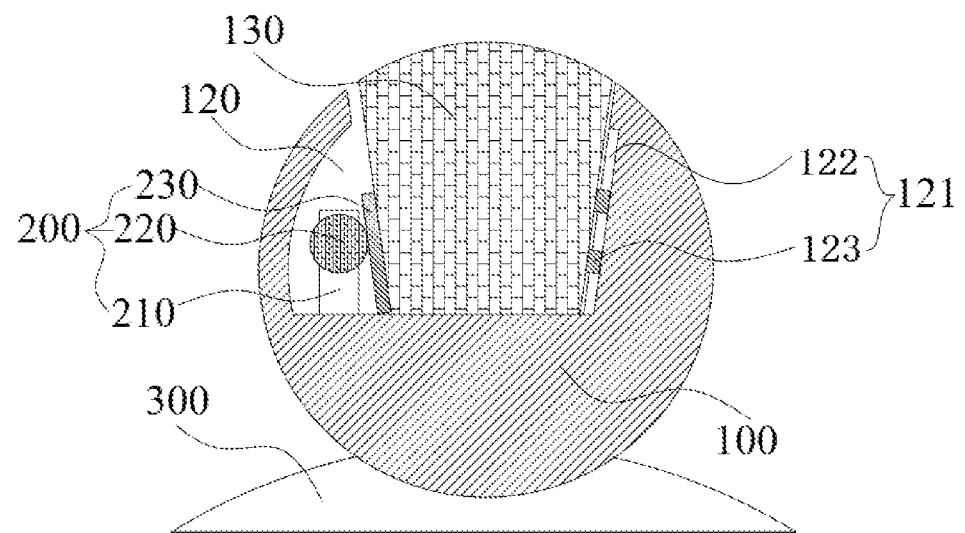
FIG. 3 is a schematic section view of a host (in which a sliding structure includes sliders and a sliding groove), in accordance with some embodiments.

Some embodiments of the present disclosure provide an in-vehicle electronic device. As shown in FIGS. 1, 3, 13 and 17, the in-vehicle electronic device 1000 includes a host 100, a first camera 130 and a first driving device 200. The host 100 has a receiving cavity 120 therein for receiving the first camera 130. The first camera 130 is movably connected to the host 100, and is configured to capture at least one image of an interior of a vehicle 800. The first driving device 200 is connected to the first camera 130, and is configured to drive the first camera 130 to move between an extended position and a retracted position, so that as shown in FIG. 1, when the first camera 130 is at the extended position, the first camera 130 is located outside the host 100, and as shown in FIG. 3, when the first camera 130 is at the retracted position, the first camera 130 is located in the receiving cavity 120.

The vehicle 800 mainly refers to a motor vehicle, such as a car, a passenger car, or a truck.

In the in-vehicle electronic device 1000, the first driving device 200 is connected to the first camera 130, and drives the first camera 130 to move between the extended position and the retracted position. When the first camera 130 is at the extended position, the first camera 130 is located outside the host 100. In this case, the first camera 130 can capture at least one image of the interior of the vehicle 800, so as to monitor the internal environment of the vehicle 800. When the first camera 130 is at the retracted position, the first camera 130 is located in the receiving cavity 120. That is, the first camera 130 is hidden inside the host 100. Thus, in the in-vehicle electronic device 1000, the first camera 130 may be hidden in or extended out of the host 100 according to usage scenarios and requirements, which makes the use more flexible.

In some embodiments, as shown in FIG. 1, the host 100 includes a display screen 110. The display screen 110 may be configured to display the at least one image of the interior of the vehicle 800 captured by the first camera 130. The display screen 110 may be further configured to display information, such as information including at least one of time, weather, or the navigation route. The contents displayed on the display screen 110 are not limited thereto herein.

In some embodiments, as shown in FIGS. 1 and 3, the in-vehicle electronic device 1000 further includes at least one sliding structure 121 connected to at least one side wall of the receiving cavity 120 and at least one respective side wall of the first camera 130. The at least one sliding structure 121 is configured to assist the first camera 130 to move between the extended position and the retracted position under driving of the first driving device 200.

In some embodiments, as shown in FIG. 3, the at least one sliding structure 121 includes one sliding structure 121.

In some examples, as shown in FIG. 3, the sliding structure 121 includes at least one slider 123 and a sliding groove 122. The sliding groove 122 is provided on a side wall of the receiving cavity 120. For example, a groove is provided in the side wall of the receiving cavity 120, and the sliding groove 122 is located in this groove. The at least one slider 123 may include one or more sliders 123, which are fixed on a side wall of the first camera 130 opposite to the side wall of the receiving cavity 120, at least partially located in the sliding groove 122 and slidable in the sliding groove 122.

In some other examples, the sliding structure 121 is a ball slide. The ball slide includes at least two slide rails and a plurality of balls located between side walls of the at least two slide rails. For example, the at least two slide rails include two slide rails. One slide rail is fixed on a side wall of the receiving cavity. For example, a groove is provided in the side wall of the receiving cavity, and the slide rail is located in this groove. The other slide rail is fixed on a side wall of the first camera opposite to the side wall of the receiving cavity. The balls may roll between the two slide rails.

In this way, the first camera 130 may slide relative to the host 100. However, the specific structure of the sliding connection between the first camera 130 and the host 100 is not limited thereto.

Figure 10:
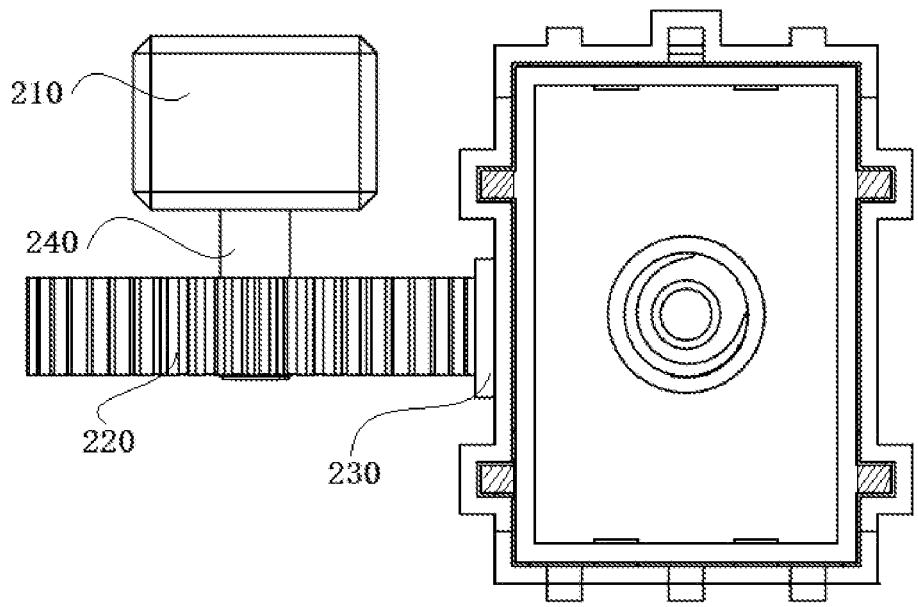
FIG. 10 is a schematic top view of a first driving device, in accordance with some embodiments.
Figure 11:
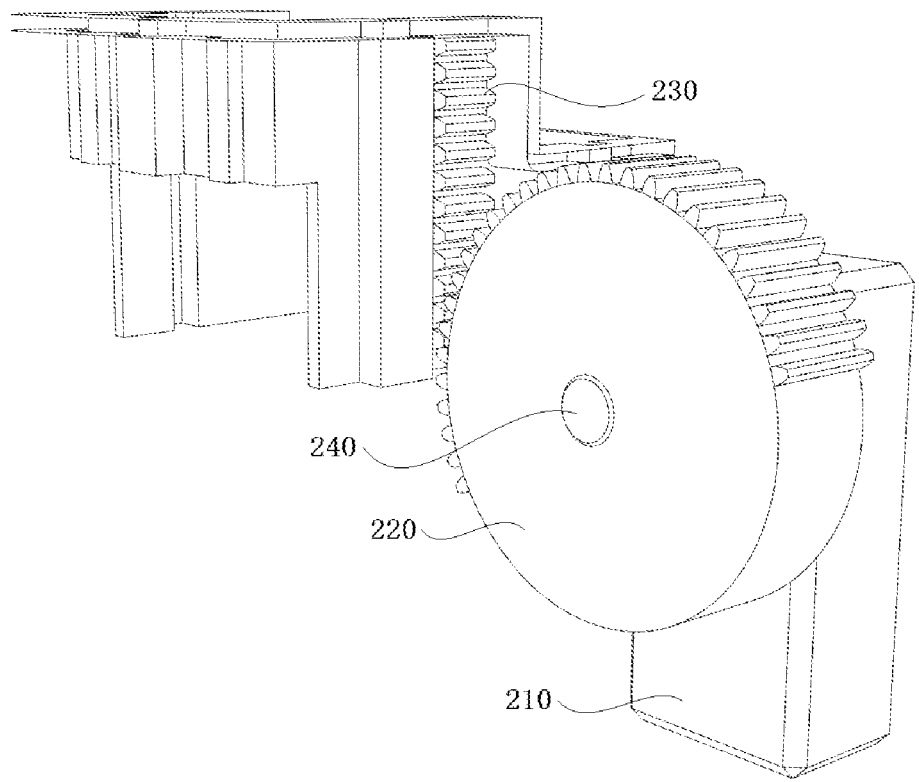
FIG. 11 is a schematic left view of a first driving device, in accordance with some embodiments.

In some embodiments, as shown in FIGS. 3, 10 and 11, the first driving device 200 includes a first motor 210, a gear 220 and a rack 230 that are disposed in the receiving cavity 120. The first motor 210 may be fixedly connected to a bottom of the receiving cavity 120. An output shaft 240 of the first motor 210 is fixedly connected to the gear 220, the gear 220 is engaged with the rack 230, and the rack 230 is fixedly connected to a side wall of the first camera 130. By fixedly connecting the rack 230 to the first camera 130 and engaging the rack 230 with the gear 220, when the first motor 210 drives the gear 220 to rotate, the rack 230 may move in its length direction, so that the rack 230 may drive the first camera 130 to move relative to the host 100.

In some embodiments, as shown in FIG. 3, the sliding structure 121 between the side wall of the first camera 130 and the side wall of the receiving cavity 120 and the rack 230 are disposed on two opposite side walls of the first camera 130, so that the overall structure may be more balanced.

In some other embodiments, as shown in FIG. 10, the at least one sliding structure 121 includes four sliding structures 121, two of the four sliding structures 121 are connected to a side wall of the first camera 130, and the other two are connected to an opposite side wall of the first camera 130. Moreover, the rack 230 is fixed on any one of the side walls of the first camera 130 that are provided with the sliding structures 121, and is located between the two sliding structures 121 on this side wall, so that the overall structure may be more stable. For the specific structure of each sliding structure 121, reference may be made to the relevant description above, which will not be repeated here.

It will be noted that the connection position of the rack 230 to the first camera 130 is not limited thereto, and the number of the at least one sliding structure 121 is not limited thereto.

Figure 4:
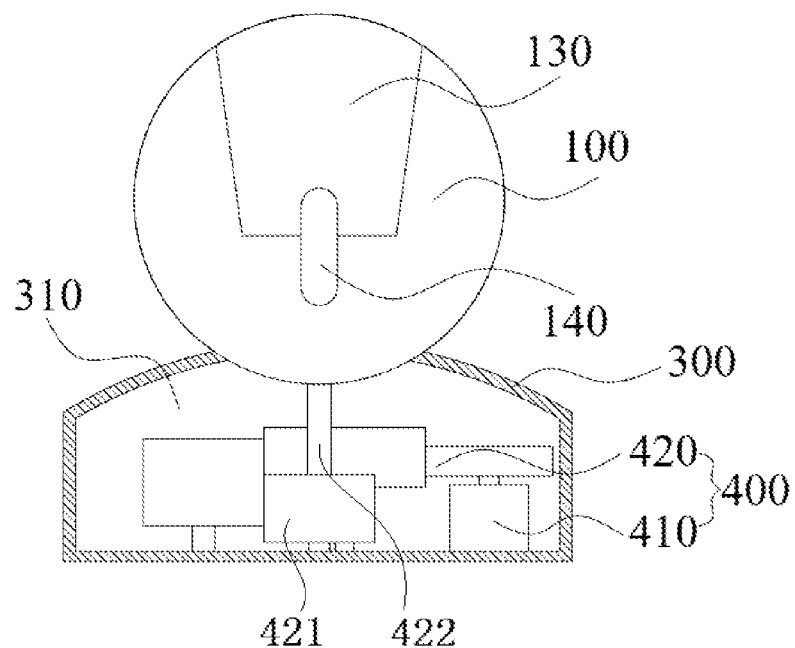
FIG. 4 is a schematic section view of a base, in accordance with some embodiments.

In some embodiments, as shown in FIGS. 1 and 4, the in-vehicle electronic device 1000 further includes a base 300 and a second driving device 400. The second driving device 400 is connected to the base 300 and the host 100. The second driving device 400 is configured to drive the host 100 to rotate horizontally relative to the base 300. In this way, the display screen 110 is rotated for the driver or passenger to view. Moreover, a shooting angle of the first camera 130 may be adjusted, so that a shooting range of the first camera 130 is large. An angle in which the host 100 may rotate horizontally relative to the base 300 is within a range of 120° to 180°, inclusive, such as 120°, 130°, 140°, 150°, 160°, 170°, or 180°.

In some embodiments, the second driving device 400 is a motor, and an output shaft of the motor is directly and fixedly connected to the host 100, so that the host 100 may rotate.

In some other embodiments, as shown in FIG. 4, the second driving device 400 is at least under a top surface of the host 100. The second driving device 400 includes a second motor 410, a reduction gear set 420 and a transmission shaft 422. The second motor 410 is connected to the reduction gear set 420, the reduction gear set 420 is connected to the transmission shaft 422, and the transmission shaft 422 is connected to the host 100. The reduction gear set 420 is configured to make a rotation speed of the host 100 slower than a rotation speed of the second motor 410, so that the host 100 rotates slowly, thereby facilitating precise adjustment of the rotation angle of the host 100.

Figure 12:
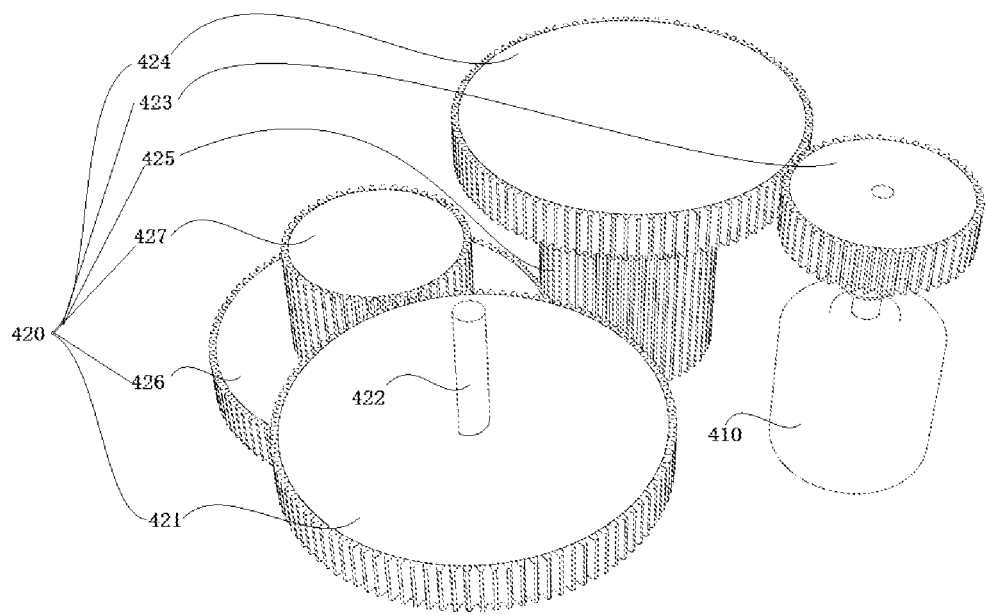
FIG. 12 is a schematic diagram of a second driving device, in accordance with some embodiments.

In some embodiments, as shown in FIGS. 4 and 12, the reduction gear set 420 includes a first gear 423, a second gear 424, a third gear 425, a fourth gear 436, a fifth gear 427, and a sixth gear 421. An output shaft of the second motor 410 is directly connected to a center of an end surface of the first gear 423. The second gear 424 is engaged with the first gear 423, and a diameter of the second gear 424 is greater than that of the first gear 423, so as to reduce the rotation speed for the first time. An end surface of the second gear 424 proximate to the second motor 410 is in direct contact with an end surface of the third gear 425, and the second gear 424 and the third gear 425 may coaxially rotate. The fourth gear 426 is engaged with the third gear 425, and a diameter of the fourth gear 426 is greater than that of the third gear 425, so as to reduce the rotation speed for the second time. An end surface of the fourth gear 426 proximate to the second gear 424 is in direct contact with an end surface of the fifth gear 427, and the fourth gear 426 and the fifth gear 427 may coaxially rotate. The sixth gear 421 is engaged with the fifth gear 427, and a diameter of the sixth gear 421 is greater than that of the fifth gear 427, so as to reduce the rotation speed for the third time. A center of an end surface of the sixth gear 421 away from the fourth gear 426 is connected to an end of the transmission shaft 422, and an opposite end of the transmission shaft 422 is connected to the host 100. The opposite end of the transmission shaft 422 may penetrates the base 300. The second motor 410 drives the first gear 423 to rotate, thereby driving the transmission shaft 422 and the host 100 to rotate. The number of gears in the reduction gear set 420 is not limited herein, and can be less than or greater than the number described herein.

In some embodiments, as shown in FIGS. 1 and 4, the base 300 has an accommodating cavity 310 therein, and the second driving device 400 is provided in the accommodating cavity 310. The sixth gear 421 of the reduction gear set 420 is connected to the host 100 through the transmission shaft 422 penetrating a top wall of the accommodating cavity 310, so as to achieve the rotation of the host 100. By arranging the second driving device 400 in the accommodating cavity 310 of the base 300, the entire host 100 and the base 300 may be disassembled, which is convenient for maintenance and replacement of parts.

Figure 16:
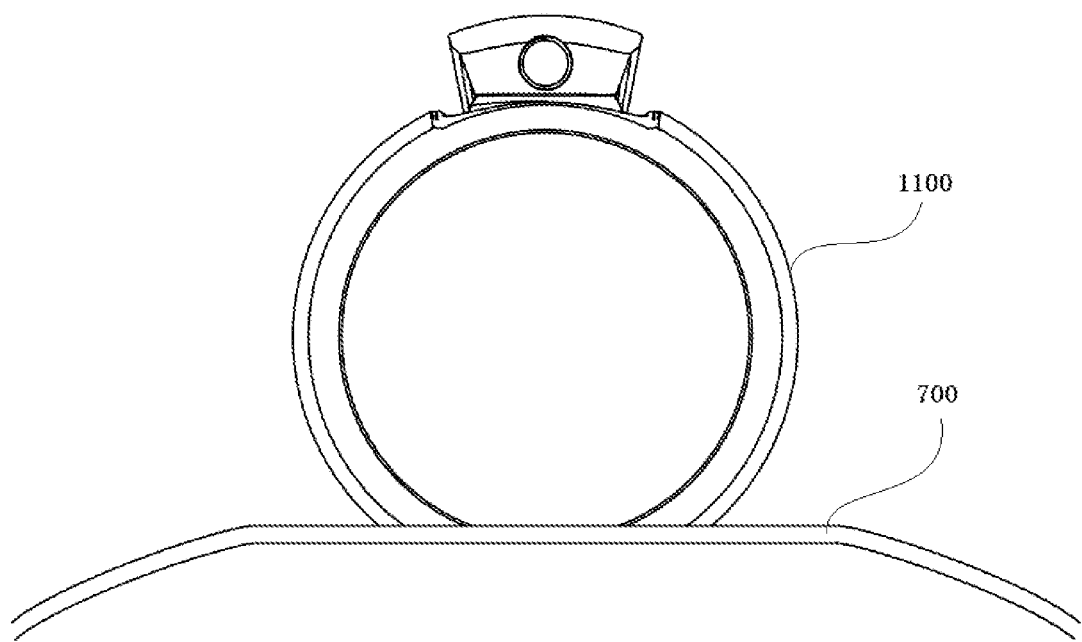
FIG. 16 is a schematic diagram of a cover, in accordance with some embodiments.

In some embodiments, as shown in FIG. 16, the in-vehicle electronic device 1000 further includes a detachable cover 700 installed at a top opening of the base 300. The detachable cover 700 is configured to open or close the accommodating cavity 310, and the transmission shaft 422 penetrates the cover 700. The cover 700 may be connected to the base 300 through threads. By providing the detachable cover 700, it is convenient to repair or replace the second motor 410 and the reduction gear set 420 inside the accommodating cavity 310.

Figure 5:
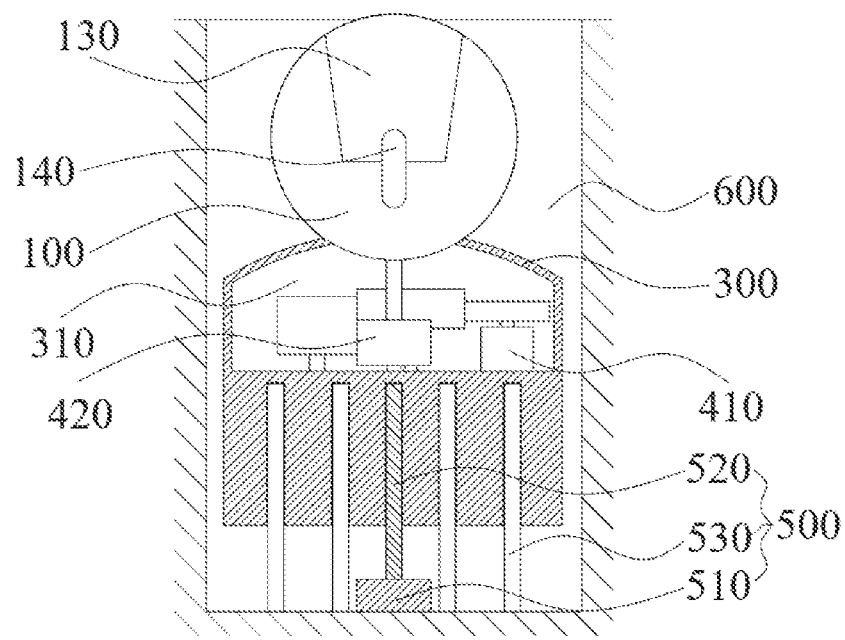
FIG. 5 is a schematic section view of an in-vehicle electronic device received in a gravity, in accordance with some embodiments.
Figure 13:
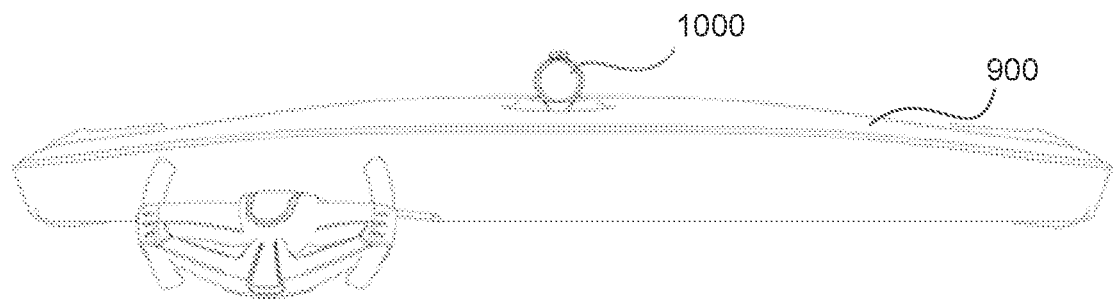
FIG. 13 is a schematic diagram of an in-vehicle electronic device (in which a first camera is at an extended position) located outside an interior trim panel in a vehicle, in accordance with some embodiments.
Figure 17:
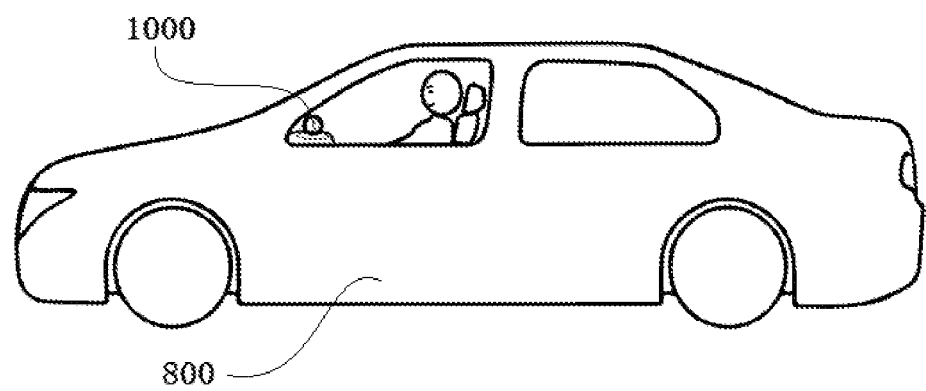
FIG. 17 is a schematic diagram of a vehicle, in accordance with some embodiments.

In some embodiments, as shown in FIGS. 5, 13 and 17, the in-vehicle electronic device 1000 further includes a lifting mechanism 500 configured to drive the base 300 to lift between a raised position and a storage position, so that as shown in FIG. 13, when the base 300 is at the raised position, both the base 300 and the host 100 are located outside an interior trim panel 900 of the vehicle 800, and as shown in FIG. 5, when the base 300 is at the storage position, both the base 300 and the host 100 are located inside the interior trim panel 900 of the vehicle 800. In a case where the first camera 130 is not used, the base 300 and the host 100 may both be located in the interior trim panel 900 through the lifting mechanism 500, which may make the interior trim panel concise.

In some embodiments, the lifting mechanism 500 may adopt a structure in which a third driving device drives the base 300 move between the raised position and the storage position with the help of at least one sliding structure. The principle and structure of the third driving device are similar to those of the first driving device 200, and the sliding structure may be referred to the related structure described above. In some examples, a cavity is provided in the interior trim panel of the vehicle, and at least one sliding groove is provided in a vertical direction on at least one side wall of the cavity. The at least one slider are fixedly connected to the base 300, at least partially located in the sliding groove, and can be driven by the third driving device to slide relative to the sliding groove, so as to achieve the lifting movement of the base 300 and the host 100.

In some other embodiments, as shown in FIGS. 5 and 13 to 15, the lifting mechanism 500 is of a screw-nut structure. In some examples, a cavity 600 is provided in the interior trim panel 900 of the vehicle 800. The lifting mechanism 500 includes a third motor 510, a screw rod 520, and at least one guide rod 530. In some examples, as shown in FIG. 5, the third motor 510, the screw rod 520, and the at least one guide rod 530 are connected to a bottom of the cavity 600. In some other examples, the lifting mechanism 500 further includes a casing disposed in the cavity 600, and the casing is matched with the cavity 600. The third motor 510, the screw rod 520, and the at least one guide rod 530 are connected to a bottom of the casing. An end face of the base 300 proximate to the third motor 510 is provided with a threaded hole 540 and at least one guide hole 550 that are parallel to each other. An output shaft 560 of the third motor 510 is fixedly connected to an end of the screw rod 520, and an opposite end of the screw rod 520 cooperates with the threaded hole 540. The at least one guide rod 530 each includes an end extending into a respective one of the at least one guide hole 550. The third motor 510 drives the screw rod 520 to rotate, so that the base 300 that cooperates with the screw rod 520 may move up and down along the screw rod 520. Moreover, the guide rod 530 plays a guiding role to ensure that the base 300 moves in the extending direction of the screw rod 520, thereby achieving the lifting movement of the base 300 and the host 100 in the extending direction of the screw rod 520.

In addition, by arranging the lifting mechanism 500 under the base 300, in a case where a cavity 600 is provided in the interior trim panel 900 of the vehicle 800, it only needs to leave a space enough for the lifting of the base 300 and the host 100, which is beneficial to reduce a cross-sectional area of the cavity 600 and simplify the overall structure.

Figure 14:
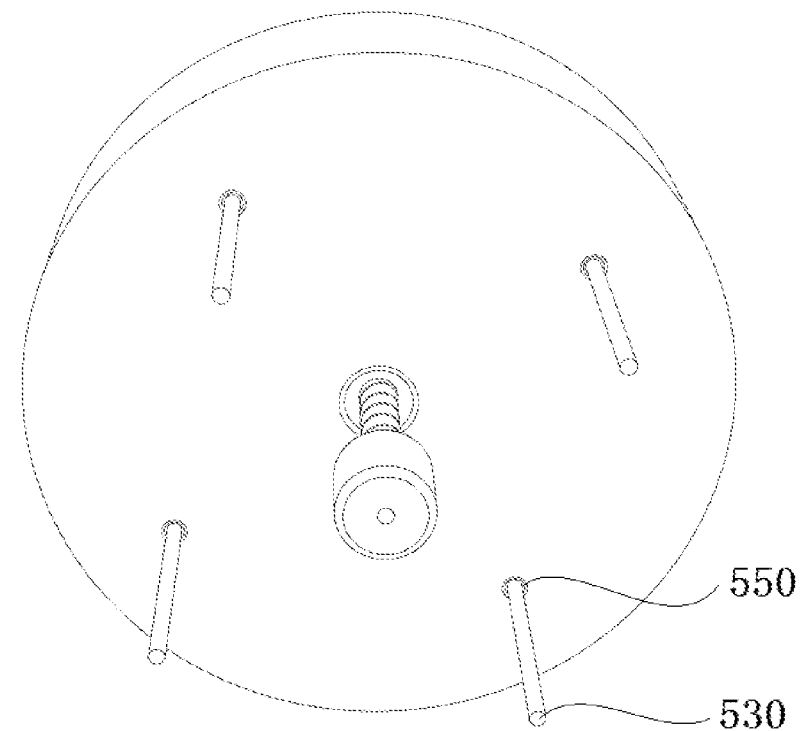
FIG. 14 is a schematic bottom view of a lifting mechanism, in accordance with some embodiments.
Figure 15:
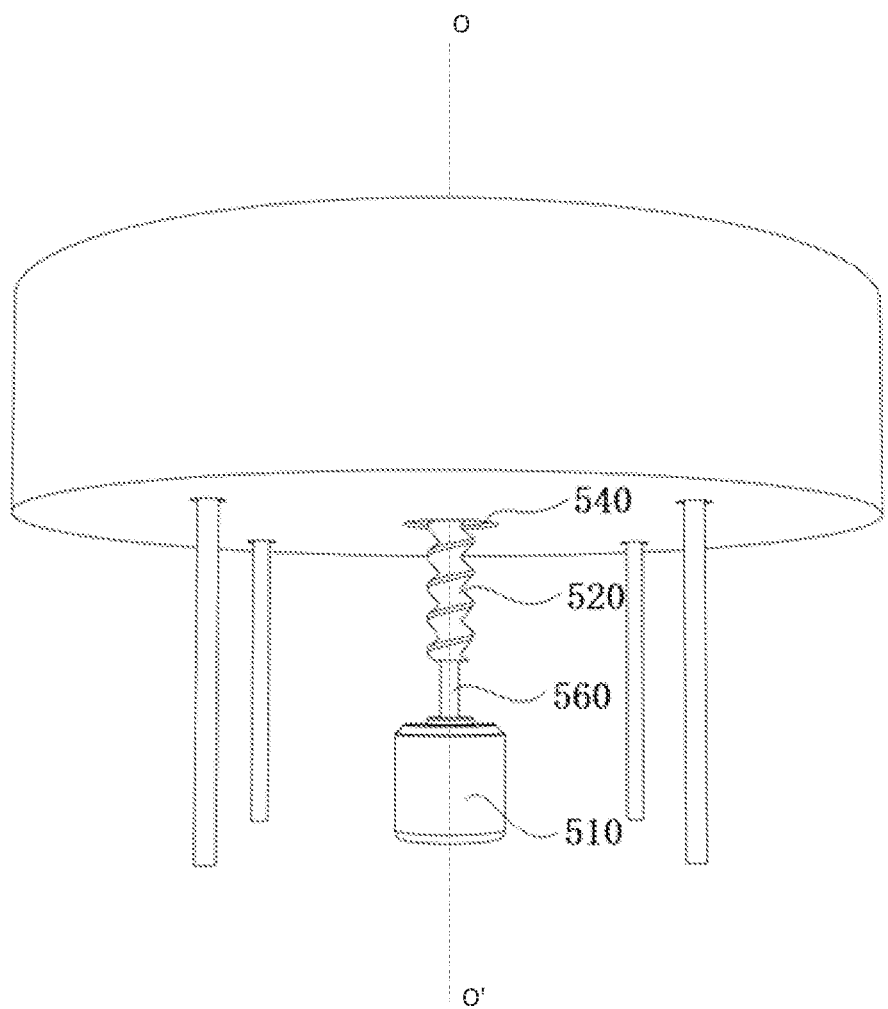
FIG. 15 is a schematic front view of a lifting mechanism, in accordance with some embodiments.

In some embodiments, as shown in FIGS. 5, 14 and 15, the at least one guide rod 530 includes a plurality of guide rods 530, and the at least one guide hole 550 includes a plurality of guide holes 550. Each guide rod 530 extends into a respective guide hole 550. By providing the plurality of guide rods 530, the entire base 300 may be supported, and it may be further ensured that the base 300 may move in an extending direction of the guide rods 530, so as to prevent the base 300 from shifting, which results in the inability of being extended or retracted.

In some embodiments, as shown in FIG. 15, the plurality of guide rods 530 are evenly distributed around an axis OO' of the threaded hole 540, which may also be a center line of the base 100, so that a force applied to the overall support structure is more balanced, and during the movement of the base 300, a force applied by the support structure to each position on the base is equal, which may prevent the base 300 from tilting during movement, and further ensure that the base 300 may move in a length direction of the guide rod 530.

Figure 6:
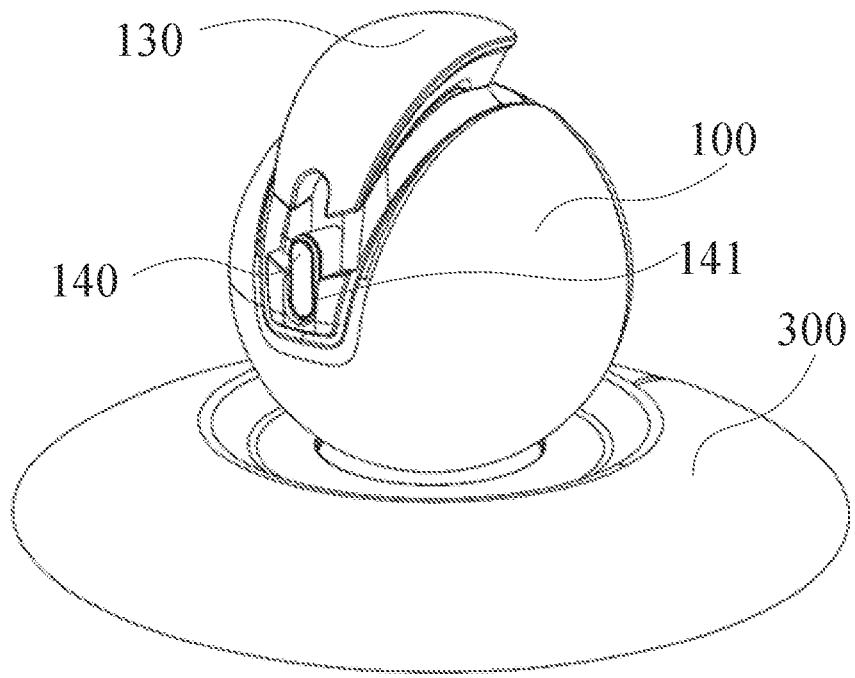
FIG. 6 is a schematic diagram of an in-vehicle electronic device (in which a first camera is at an extended position), in accordance with some embodiments.
Figure 7:
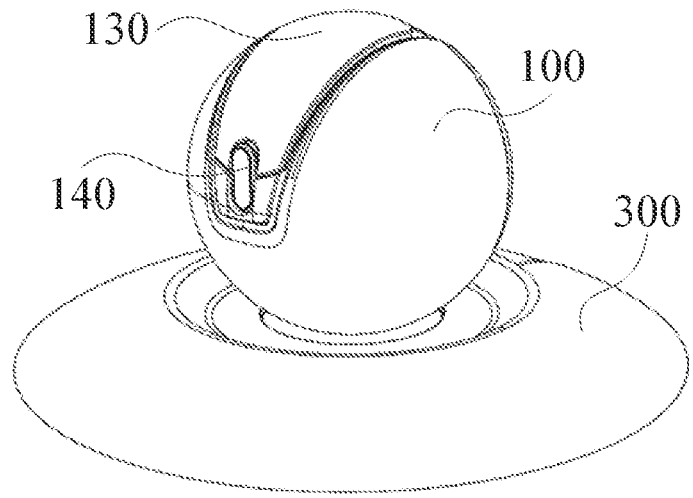
FIG. 7 is a schematic diagram of an in-vehicle electronic device (in which a first camera is at a retracted position); in accordance with some embodiments.

In some embodiments, as shown in FIGS. 6 and 7, the in-vehicle electronic device 1000 further includes a second camera 140 connected to the host 100. The second camera 140 is configured to capture at least one image of the exterior of the vehicle 800. By arranging the second camera 140, the external conditions of the vehicle 800 may be monitored. When an emergency occurs, an alarm signal may be sent to remind the driver to take measures in time.

In some embodiments, the second camera 140 is moveably connected to the host 100. That is, both the second camera 140 and the first camera 130 may be driven to be extended or retracted through the first driving device 200.

In some other embodiments, as shown in FIGS. 6 and 7, the second camera 140 can be disposed in the host 100. For example, as shown in FIG. 6, a groove 141 is provided in an outer surface of the host 100, and the second camera 140 is located in the groove 141. In this case, when the first camera 130 is located inside the host 100, the second camera 140 may operate normally, so that the use of the in-vehicle electronic device 1000 is more diversified.

In some embodiments, as shown in FIGS. 1 and 6, a lens of the second camera 140 and a lens of the first camera 130 face two opposite directions. For example, the lens of the first camera 130 faces the back of the vehicle 800, and the lens of the second camera 140 faces the front of the vehicle 800. Both the first camera 130 and the second camera 140 may capture images of the inside and the outside of the vehicle to monitor environmental conditions inside and outside the vehicle.

Figure 2:
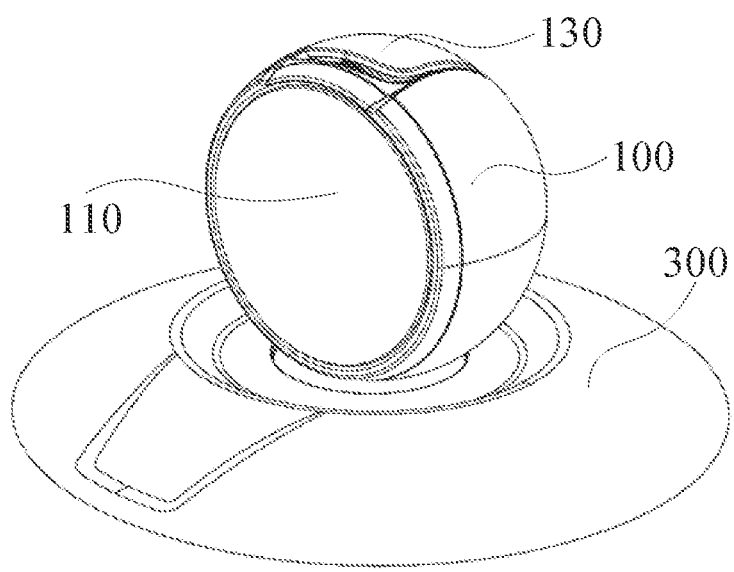
FIG. 2 is a schematic diagram of an in-vehicle electronic device (in which a first camera is at a retracted position), in accordance with some embodiments.

In some embodiments, as shown in FIGS. 1 and 3, a top surface of the host 100 is a curved surface with an opening. That is, the first camera 130 is extended or retracted through the opening of the receiving cavity 120. When the first camera 130 is at the retracted position, as shown in FIGS. 2 and 7, a top surface of the first camera 130 and the top surface of the host 100 are matched to form an integral curved surface. In this case, the passengers in the vehicle cannot directly see that the first camera 130 is provided on the host 100, so that the entire host 100 is more concise.

In some embodiments, the in-vehicle electronic device 1000 further includes a coating 1100 disposed on outer walls of the host 100 and the first camera 130 and/or the second camera 140. The coating 1100 is made of a material with a light absorption rate of less than 15%. The material of the coating 1100 may include at least one of chromium nitride (CrN), titanium nitride (TIN), titanium carbonitride (TiCN), or titanium aluminum nitride (TiAlN). The coating 1100 may reflect most of light irradiated on the in-vehicle electronic device 1000, thereby avoiding an increase in the internal temperature of the in-vehicle electronic device 1000 due to the absorption of light energy. As a result, it may be possible to avoid the occurrence of damage of optical components inside the in-vehicle electronic device 1000 due to an excessive temperature, and may be conducive to prolonging the service life of the in-vehicle electronic device 1000.

In some other embodiments, the in-vehicle electronic device 1000 further includes a housing disposed on the outside of the host 100, and the coating 1100 is disposed on the outer wall of the housing, which is not limited. In this case, the housing may be the casing described above.

For example, in summer, the temperature is high, and the coating 1100 with the light absorption rate of less than 15% may prevent the internal temperature of the in-vehicle electronic device 1000 from increasing due to excessive light absorption, thereby preventing internal components from being damaged due to the excessive temperature. In winter, the weather is cold, and the internal temperature of the in-vehicle electronic device 1000 will rise when it is directly subjected to sunlight, and the thermal expansion and cold contraction will cause deformation of the internal components. In addition, since a deformation rate of each component is different, it may be possible to cause damage to the components once the components squeeze each other due to the deformation. By providing the coating 1100 with the light absorption rate of less than 15%, it may be possible to prevent the internal temperature of the in-vehicle electronic device 1000 from rising, and avoid an excessive temperature difference, which causes excessive deformation of the internal components due to the thermal expansion and cold contraction. As a result, it may be possible to avoid damage to the components once the components squeeze each other.

Some embodiments of the present disclosure provide a vehicle 800 that includes the in-vehicle electronic device 1000 according to any of the above embodiments. The operating states of the first camera 130 and the second camera 140 may be changed according to the usage scenario and requirements through the above in-vehicle electronic device 1000.

Some embodiments of the present disclosure provide a method for controlling the in-vehicle electronic device. The method may be performed by a control device of the in-vehicle electronic device 1000. The control device of the in-vehicle electronic device 1000 may be the in-vehicle electronic device 1000 itself. For example, the display, a user interface, and a control system are integrated into one device. The control device may also be a part of devices in the in-vehicle electronic device 1000, e.g., a chip in the in-vehicle electronic device 1000, which is not limited here. If the control device of the in-vehicle electronic device 1000 receives a privacy mode control instruction when the in-vehicle electronic device 1000 is in a monitoring mode, it controls the first camera 130 of the in-vehicle electronic device 1000 to be turned off. This method may more reasonably control the operating mode of the first camera 130 of the in-vehicle electronic device 1000.

Figure 8:
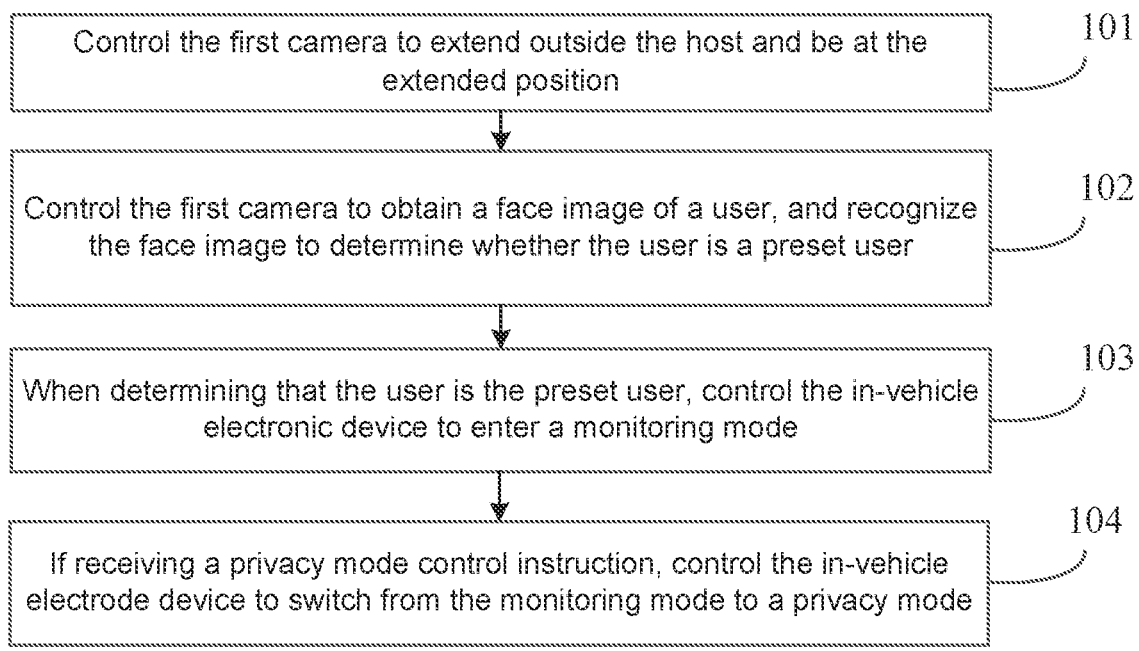
FIG. 8 is a flow diagram of a method for controlling an in-vehicle electronic device, in accordance with some embodiments.

As shown in FIG. 8, the method for controlling the in-vehicle electronic device may include step 101 to step 104.

In step 101, the control device controls the first camera to extend outside the host and be at the extended position.

For examples, the control device controls the first camera to extend outside the host when receiving a signal indicating that a face image is to be obtained, when the vehicle 800 starts, or the like.

In step 102, the control device controls the first camera to obtain a face image of a user, and recognizes the face image to determine whether the user is a preset user.

The preset user may be the owner of the vehicle 800. The information of the preset user may be pre-stored in a memory, such as a random access memory (RAM) or a non-volatile memory, such as a disk memory, or a flash memory in the in-vehicle electronic device 1000 or the vehicle 800.

In step 103, when determining that the user is the preset user, the control device controls the in-vehicle electronic device 1000 to enter a monitoring mode.

In step 104, if the control device receives a privacy mode control instruction, the control device controls the in-vehicle electronic device to switch from the monitoring mode to a privacy mode, so that the first camera is retracted into the host and at the retracted position.

In some examples, the control device may obtain a face image of a target user (e.g., a current driver of the vehicle 800) through the first camera 130, and then perform feature recognition on the obtained face image. When the control device determines that the target user is the preset user, the control device control the in-vehicle electronic device 1000 is controlled to enter the monitoring mode. For example, the control device of the in-vehicle electronic device 1000 may extract feature values of the obtained face image. For example, the control device of the in-vehicle electronic device 1000 may extract feature values of facial features such as the eyes, mouth, and nose of the obtained face image, and then matches the extracted feature values with preset feature values that are pre-stored in the memory in the in-vehicle electronic device 1000 or the vehicle 800. If a matching degree reaches a preset matching degree, the control device determines that the target user is the preset user.

The preset matching degree may be a parameter determined in advance and pre-stored in the memory, and the preset user may be a user determined in advance (e.g., a person who owns the ownership of the current vehicle 800) and his/her information is pre-stored in the memory.

It can be understood that in practical applications, the target user may also be determined as the preset user in other manners, which is not limited in the embodiments of the present disclosure. For example, the control device of the in-vehicle electronic device 1000 may extract the feature values of the obtained face image, determine the identity information of the target user according to the extracted feature values, and then compare the identity information of the target user with the identity information of the preset user. When the identity information of the target user matches the identity information of the preset user successfully, the control device determines that the target user is the preset user.

In some embodiments, the control device of the in-vehicle electronic device 1000 may perform a fatigue detection on the target user after the control device controls the in-vehicle electronic device 1000 to enter the monitoring mode.

In some examples, when the control device of the in-vehicle electronic device 1000 controls the in-vehicle electronic device 1000 to enter the monitoring mode, the first camera 130 may capture the face image of the target person and perform the feature recognition on the face image, and issue a warning when it determines that the face image meets preset conditions. For example, the control device of the in-vehicle electronic device 1000 may extract the feature values of the obtained face image, perform an emotion recognition on the feature values, determine whether the target user is in a fatigued state, and issue an early warning to warn the target user when the control device determines that the target user is in the fatigued state.

The method of performing the emotion recognition on the feature values of the face image may be referred to the related description of the emotion recognition in the field of the face recognition technology in the prior art, which will not be repeated here.

For example, the monitoring mode may mean that both the first camera 130 and the second camera 140 are in the operating mode. That is, the conditions inside and outside the vehicle are monitored simultaneously.

The privacy mode means that the first camera 130 of the in-vehicle electronic device 1000 is controlled to be turned off, and the first motor 210 is controlled to drive the gear 220 to rotate, so as to drive the rack 230 and the first camera 130 to move to the retracted position. That is, the first camera 130 is located in the receiving cavity 120 of the host 100. The second camera 140 is still in the operating mode. That is, the second camera 140 can monitor the conditions outside the vehicle.

It will be noted that the first camera 130 being controlled to be turned off involved in the method for controlling the in-vehicle electronic device means that the first camera 130 is controlled to stop operating (that is, stop capturing images).

In some embodiments, the privacy mode control instruction may be triggered in response to a first keyword. For example, the first keyword may be "start the privacy mode". When the user speaks the voice password of "start the privacy mode", the control device of the in-vehicle electronic device 1000 will receive the privacy mode control instruction and control the in-vehicle electronic device 1000 to start the privacy mode.

In some other embodiments, the privacy mode control instruction is triggered in response to a first button operation on the in-vehicle electronic device 1000. For example, the in-vehicle electronic device 1000 is provided with a "start privacy mode button". When the user clicks or long presses the "start privacy mode button", the control device of the in-vehicle electronic device 1000 will receive the privacy mode control instruction and control the in-vehicle electronic device 1000 to start the privacy mode.

In some other embodiments, the privacy mode control instruction is triggered when a first trigger operation is performed on the terminal.

For example, the terminal may be of different types, such as a mobile phone, a tablet computer, a desktop computer, a laptop computer, a notebook computer, an ultra-mobile personal computer (UMPC), a handheld computer, a netbook, a personal digital assistant (PDA), a wearable electronic device, or a virtual reality device.

An application program for controlling the in-vehicle electronic device 1000 may be installed on the terminal, and the user may perform a trigger operation on the interface of the application program of the terminal to control the in-vehicle electronic device 1000. For example, the interface of the application program for controlling the in-vehicle electronic device 1000 may include a virtual button of "start the privacy mode", When the user performs a tap operation, a long press operation or a sliding operation on the virtual button of "start the privacy mode", the control device of the in-vehicle electronic device 1000 will receive the privacy mode control instruction, and control the in-vehicle electronic device 1000 to start the privacy mode.

It can be understood that, in actual applications, the users may operate the terminal through other manners to trigger the privacy mode control instruction, which is not limited.

In the method for controlling the in-vehicle electronic device 1000, when the in-vehicle electronic device 1000 starts the monitoring mode, the control device of the in-vehicle electronic device 1000 may receive the privacy mode control instruction, and control the first camera 130 of the in-vehicle electronic device 1000 to be turned off. Therefore, after the in-vehicle electronic device 1000 starts the monitoring mode, the first camera 130 of the in-vehicle electronic device 1000 is not always turned on. The privacy mode control instruction may be sent to the control device of the in-vehicle electronic device 1000 through the user's operation, so that the control device of the in-vehicle electronic device 1000 controls the in-vehicle electronic device 1000 to switch to the privacy mode, i.e., controls the first camera 130 of the in-vehicle electronic device 1000 to be turned off. Therefore, the operating mode of the first camera 130 of the in-vehicle electronic device 1000 may be more reasonably controlled.

Figure 9:
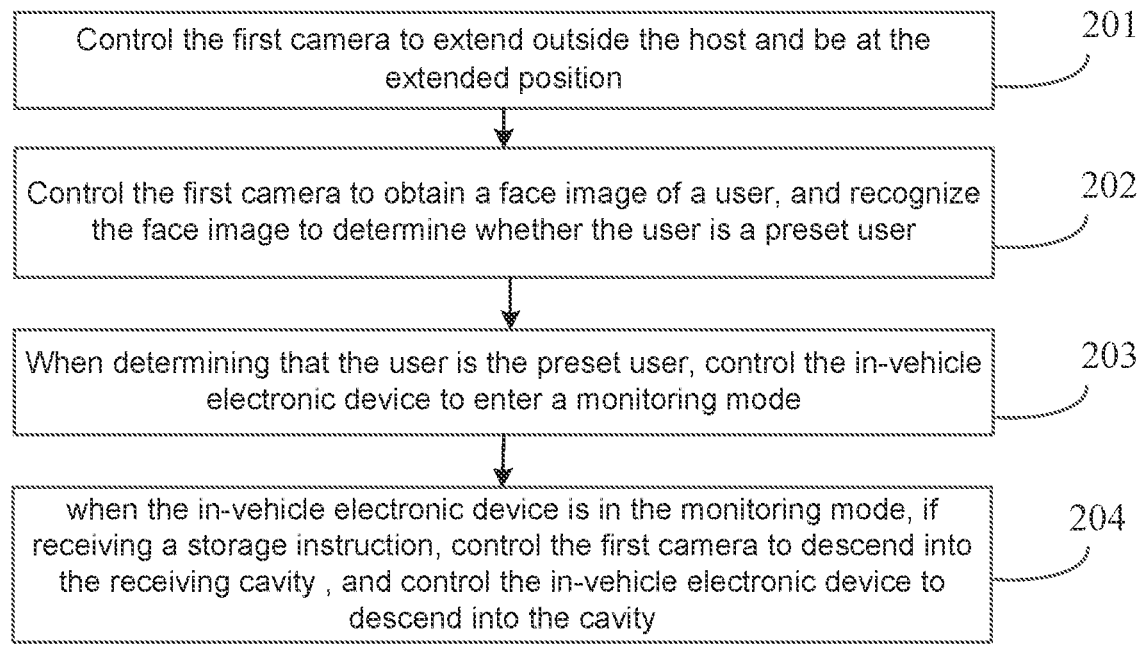
FIG. 9 is a flow diagram of another method for controlling an in-vehicle electronic device, in accordance with some embodiments.

As shown in FIG. 9, some embodiments of the present disclosure provide a method for controlling the in-vehicle electronic device, including step 201 to step 204.

In step 201, the control device of the in-vehicle electronic device 1000 controls the first camera to extend outside the host and be at the extended position.

For examples, the control device controls the first camera to extend outside the host when receiving a signal indicating that a face image is to be obtained, when the vehicle 800 starts, or the like.

In step 202, the control device control the first camera to obtain a face image of a user, and recognizes the face image to determine whether the user is a preset user.

The preset user may be the owner of the vehicle 800. The information of the preset user may be pre-stored in a memory, such as a random access memory (RAM) or a non-volatile memory, such as a disk memory, or a flash memory in the in-vehicle electronic device 1000 or the vehicle 800.

In step 203, when the control devices determines that the user is a preset user, the control device controls the in-vehicle electronic device 1000 to enter a monitoring mode.

In step 204, when the in-vehicle electronic device 1000 is in the monitoring mode, if the control device receives a storage instruction, the control device controls the first camera 130 to descend into the receiving cavity 120 provided in the host 100, and controls the in-vehicle electronic device 1000 to descend into the cavity 600 provided in the interior trim panel 900 of the vehicle 800.

A storage mode means that both the first camera 130 and the second camera 140 are turned off, and are descended into the cavity 600 provided in the interior trim panel 900 of the vehicle 800 (that is, both the first camera 130 and the second camera 140 stop capturing images).

In this way, the operating modes of the first camera 130 and the second camera 140 of the in-vehicle electronic device may be more reasonably controlled to save space.

It will be noted that the step 204 may be combined with the steps 101 to 104. For example, the step 204 may be performed after the step 103, or may be performed after the step 104.

Some embodiments of the present disclosure provide a non-transitory computer-readable storage medium. The computer-readable storage medium stores computer program instructions that, when executed by a processor (e.g., the control device described above), cause the processor to perform one or more steps in the method described in any one of the above embodiments.

For example, the non-transitory computer-readable storage medium may include, but is not limited to: a magnetic storage device (e.g., a hard disk, a floppy disk, or a magnetic tape), an optical disk (e.g., a compact disk (CD)), a digital versatile disk (DVD), a smart card and a flash memory device (e.g., an erasable programmable read-only memory (EPROM), a card, a stick or a key drive). The various computer-readable storage media may represent one or more devices and/or other machine-readable storage media for storing information.

In the description of the above embodiments, specific features, structures, materials or characteristics may be combined in an appropriate manner in any one or more embodiments or examples.

The foregoing descriptions are merely specific implementations of the present disclosure, but the protection scope of the present disclosure is not limited thereto. Any changes or replacements that a person skilled in the art could conceive of within the technical scope of the present disclosure shall be included in the protection scope of the present disclosure. Therefore, the protection scope of the present disclosure shall be subject to the protection scope of the claims.

What is claimed is:

1. An in-vehicle electronic device, comprising:
   a host having a receiving cavity;
   a first camera movably connected to the host, and configured to capture at least one image of an interior of a vehicle;

a first driving device connected to the first camera and configured to drive the first camera to move between an extended position and a retracted position, so that when the first camera is at the extended position, the first camera is located outside the host, and when the first camera is at the retracted position, the first camera is located in the receiving cavity;

a base; and a second driving device connected to the base and the host, and configured to drive the host to rotate horizontally relative to the base.

2. The in-vehicle electronic device according to claim 1, further comprising at least one sliding structure connected to at least one side wall of the receiving cavity and at least one respective side wall of the first camera, wherein the at least one sliding structure is configured to assist the first camera to move between the extended position and the retracted position under driving of the first driving device.

3. The in-vehicle electronic device according to claim 2, wherein the at least one sliding structure includes one sliding structure, and the one sliding structure includes at least one slider and a sliding groove;

a groove is provided in one of the at least one side wall of the receiving cavity, and the sliding groove is fixed in the groove; and the at least one slider is fixed on a side wall of the first camera opposite to the one of the at least one side wall of the receiving cavity, is at least partially located in the sliding groove and is slidable in the sliding groove.

4. The in-vehicle electronic device according to claim 2, wherein the first driving device includes a first motor, a gear, and a rack that are disposed in the receiving cavity, an output shaft of the first motor is fixedly connected to the gear, the gear is engaged with the rack, and the rack is fixedly connected to a side wall of the first camera.

5. The in-vehicle electronic device according to claim 4, wherein the at least one sliding structure includes four sliding structures, two of the four sliding structures are connected to a side wall of the first camera, and another two are connected to an opposite side wall of the first camera; and the rack is fixed on any side wall of the side walls of the first camera that are provided with the sliding structures and is located between the two sliding structures on the side wall of the side walls.

6. The in-vehicle electronic device according to claim 5, wherein each sliding structure includes at least one slider and a sliding groove;

a groove is provided in a side wall of the receiving cavity to which the sliding structure is connected, and the sliding groove is fixed in the groove, and the at least one slider is connected to a side wall of the first camera opposite to the side wall of the receiving cavity, is at least partially located in the sliding groove and is slidable in the sliding groove.

7. The in-vehicle electronic device according to claim 1, wherein the second driving device includes:

a second motor;

a transmission shaft connected to the host;

a reduction gear set connected to the second motor and the transmission shaft, and configured to make a rotation speed of the host slower than a rotation speed output by the second motor.

8. The in-vehicle electronic device according to claim 7, wherein the reduction gear set includes:

a first gear, wherein a center of an end surface of the first gear is directly connected to an output shaft of the second motor;

a second gear engaged with the first gear, wherein a diameter of the second gear is greater than a diameter of the first gear;

a third gear, wherein an end surface of the second gear proximate to the second motor is in direct contact with an end surface of the third gear, and the second gear and the third gear are configured to coaxially rotate;

a fourth gear engaged with the third gear, wherein a diameter of the fourth gear is greater than a diameter of the third gear;

a fifth gear, wherein an end surface of the fourth gear proximate to the second gear is in direct contact with an end surface of the fifth gear, and the fourth gear and the fifth gear are configured to coaxially rotate; and a sixth gear engaged with the fifth gear, wherein a diameter of the sixth gear is greater than a diameter of the fifth gear, a center of an end surface of the sixth gear away from the fourth gear is connected to an end of the transmission shaft, and an opposite end of the transmission shaft is connected to the host.

9. The in-vehicle electronic device according to claim 1, wherein the base has an accommodating cavity therein, and the second driving device is disposed in the accommodating cavity.

10. The in-vehicle electronic device according to claim 1, further comprising a lifting mechanism connected to the base, and configured to drive the base to lift between a raised position and a storage position, so that when the base is at the raised position, both the base and the host are located outside an interior trim panel of the vehicle, and when the base is at the storage position, both the base and the host are located inside the interior trim panel of the vehicle.

11. The in-vehicle electronic device according to claim 10, wherein the lifting mechanism includes:

a third motor, wherein an end surface of the base proximate to the third motor is provided with a threaded hole and at least one guide hole that are parallel to each other;

a screw rod, wherein an end of the screw rod is fixedly connected to an output shaft of the third motor, and an opposite end of the screw rod cooperates with the threaded hole; and at least one guide rod each including an end extending into a respective one of the at least one guide hole.

12. The in-vehicle electronic device according to claim 11, wherein the at least one guide hole includes a plurality of guide holes, and the plurality of guide holes are evenly distributed around an axis of the threaded hole; the at least one guide rod includes a plurality of guide rods.

13. The in-vehicle electronic device according to claim 1, further comprising a second camera connected to the host, and configured to capture at least one image of an exterior of the vehicle.

14. The in-vehicle electronic device according to claim 13, wherein a groove is provided in an outer surface of the host, and the second camera is located in the groove.

15. The in-vehicle electronic device according to claim 1, wherein a top surface of the host is a curved surface with an opening, the first camera is configured to be extended or retracted through the opening, and the first camera is configured such that when the first camera is at the retracted position, a top surface of the first camera and the top surface of the host are matched to form an integral curved surface.

16. The in-vehicle electronic device according to claim 1, further comprising a coating disposed on outer walls of the host and the first camera, wherein the coating is made of a material with a light absorption rate of less than 15%.

17. A vehicle comprising the in-vehicle electronic device according to claim 1.

18. A method for controlling the in-vehicle electronic device according to claim 1, the method comprising:
controlling the first camera to extend outside the host and be at the extended position;
controlling the first camera to obtain a face image of a user;
recognizing the face image to determine whether the user is a preset user;
controlling the in-vehicle electronic device to enter a monitoring mode when determining that the user is the preset user; and
if receiving a privacy mode control instruction, controlling the in-vehicle electronic device to switch from the monitoring mode to a privacy mode, so that the first camera is retracted into the host and at the retracted position.

19. A non-transitory computer-readable storage medium storing computer program instructions that, when executed by a processor, cause the processor to perform the method according to claim 18.

20. An in-vehicle electronic device, comprising:
a host having a receiving cavity;
a first camera movably connected to the host, and configured to capture at least one image of an interior of a vehicle;
a first driving device connected to the first camera and configured to drive the first camera to move between an extended position and a retracted position, so that when the first camera is at the extended position, the first camera is located outside the host, and when the first camera is at the retracted position, the first camera is located in the receiving cavity; and
at least one sliding structure connected to at least one side wall of the receiving cavity and at least one respective side wall of the first camera, wherein the at least one sliding structure is configured to assist the first camera to move between the extended position and the retracted position under driving of the first driving device,
wherein the first driving device includes a first motor, a gear, and a rack that are disposed in the receiving cavity, an output shaft of the first motor is fixedly connected to the gear, the gear is engaged with the rack, and the rack is fixedly connected to a side wall of the first camera; and
the at least one sliding structure includes four sliding structures, two of the four sliding structures are connected to a side wall of the first camera, and another two are connected to an opposite side wall of the first camera; and the rack is fixed on any side wall of the side walls of the first camera that are provided with the sliding structures and is located between the two sliding structures on the side wall of the side walls.

* * * * *